United States Patent
Mulder et al.

(10) Patent No.: US 9,022,631 B2
(45) Date of Patent: May 5, 2015

(54) FLEXIBLE LIGHT PIPE

(71) Applicant: Innotec Corp., Zeeland, MI (US)

(72) Inventors: Jason R. Mulder, Zeeland, MI (US); Justin Philip Boetsma, Zeeland, MI (US)

(73) Assignee: Innotec Corp., Zeeland, MI (US)

( * ) Notice: Subject to any disclaimer, the term of this patent is extended or adjusted under 35 U.S.C. 154(b) by 169 days.

(21) Appl. No.: 13/917,316

(22) Filed: Jun. 13, 2013

(65) Prior Publication Data

US 2013/0336004 A1  Dec. 19, 2013

Related U.S. Application Data

(60) Provisional application No. 61/659,051, filed on Jun. 13, 2012.

(51) Int. Cl.
| | |
|---|---|
| *F21V 7/04* | (2006.01) |
| *F21V 8/00* | (2006.01) |
| *G02B 6/46* | (2006.01) |
| *B60Q 3/02* | (2006.01) |

(52) U.S. Cl.
CPC ........... *G02B 6/0011* (2013.01); *G02B 6/46* (2013.01); *B60Q 3/0216* (2013.01); *G02B 6/006* (2013.01); *G02B 6/0068* (2013.01); *G02B 6/0076* (2013.01); *G02B 6/0091* (2013.01)

(58) Field of Classification Search
CPC .......... G09F 13/02; G09F 13/04; G09F 13/18
USPC ................. 362/812, 97.1, 97.2, 601, 27, 602; 40/551, 545, 579
See application file for complete search history.

(56) References Cited

U.S. PATENT DOCUMENTS

| | | | |
|---|---|---|---|
| 1,515,717 A | 11/1924 | Ayotte | |
| 2,254,962 A | 9/1941 | Harris et al. | |
| 3,456,043 A | 7/1969 | Emery | |
| 3,541,488 A | 11/1970 | Odson | |
| 4,041,301 A | 8/1977 | Pelchat | |
| 4,076,373 A * | 2/1978 | Moretti | 359/507 |
| 4,173,035 A | 10/1979 | Hoyt | |
| 4,211,955 A | 7/1980 | Ray | |
| 4,267,559 A | 5/1981 | Johnson et al. | |
| 4,277,819 A | 7/1981 | Sobota et al. | |

(Continued)

FOREIGN PATENT DOCUMENTS

| | | |
|---|---|---|
| DE | 3916875 | 12/1990 |
| DE | 29811417 | 10/1998 |

(Continued)

OTHER PUBLICATIONS

Howstuffworks, "Inside a Light Emitting Diode," 2002 (1 page).

(Continued)

*Primary Examiner* — Ali Alavi
(74) *Attorney, Agent, or Firm* — Price Heneveld LLP

(57) ABSTRACT

A flexible light assembly includes a plurality of light guides that may be operably connected to one or more LED light sources. The light guides may include smooth surfaces that internally reflect light except at selected areas having irregular surface features that permit the escape of light to provide illuminated letters, numbers, designs, or the like. The light guides and LED light source may be disposed within a flexible housing.

36 Claims, 10 Drawing Sheets

(56) References Cited

U.S. PATENT DOCUMENTS

| | | |
|---|---|---|
| 4,453,903 A | 6/1984 | Pukaite |
| 4,544,991 A | 10/1985 | Gorsuch |
| 4,645,970 A | 2/1987 | Murphy |
| 4,733,335 A | 3/1988 | Serizawa et al. |
| 4,744,011 A | 5/1988 | Tomita et al. |
| 4,764,645 A | 8/1988 | Takasawa |
| 4,788,630 A | 11/1988 | Gavagan |
| 4,794,431 A | 12/1988 | Park |
| 4,819,136 A | 4/1989 | Ramsey |
| 4,857,483 A | 8/1989 | Steffen |
| 4,860,436 A | 8/1989 | Hirabayashi et al. |
| 4,885,663 A | 12/1989 | Parker |
| 4,886,960 A | 12/1989 | Molyneux et al. |
| 4,897,771 A | 1/1990 | Parker |
| 4,907,132 A | 3/1990 | Parker |
| 4,935,665 A | 6/1990 | Murata |
| 4,948,242 A | 8/1990 | Desmond et al. |
| 4,954,308 A | 9/1990 | Yabe et al. |
| 4,965,933 A | 10/1990 | Mraz et al. |
| 4,965,950 A | 10/1990 | Yamada |
| 4,985,810 A | 1/1991 | Ramsey |
| 5,036,248 A | 7/1991 | McEwan et al. |
| 5,038,255 A | 8/1991 | Nishihashi et al. |
| 5,070,219 A | 12/1991 | Grosskrueger et al. |
| 5,119,174 A | 6/1992 | Chen |
| 5,136,483 A | 8/1992 | Schoniger et al. |
| 5,160,200 A | 11/1992 | Cheselske |
| 5,160,201 A | 11/1992 | Wrobel |
| 5,161,872 A | 11/1992 | Sasaki et al. |
| 5,178,448 A | 1/1993 | Adams et al. |
| 5,182,032 A | 1/1993 | Dickie et al. |
| 5,193,895 A | 3/1993 | Naruke et al. |
| 5,203,060 A | 4/1993 | Mraz et al. |
| 5,228,223 A | 7/1993 | Lan |
| 5,236,374 A | 8/1993 | Leonard et al. |
| 5,239,406 A | 8/1993 | Lynam |
| 5,241,457 A | 8/1993 | Sasajima |
| 5,249,104 A | 9/1993 | Mizobe |
| 5,285,060 A | 2/1994 | Larson et al. |
| 5,297,010 A | 3/1994 | Camarota et al. |
| 5,313,729 A | 5/1994 | Sakai et al. |
| 5,325,271 A | 6/1994 | Hutchisson |
| 5,325,275 A | 6/1994 | Liu |
| 5,334,539 A | 8/1994 | Shinar et al. |
| 5,337,225 A | 8/1994 | Brookman |
| 5,355,245 A | 10/1994 | Lynam |
| 5,371,659 A | 12/1994 | Pastrick et al. |
| 5,382,811 A | 1/1995 | Takahashi |
| 5,404,282 A | 4/1995 | Klinke et al. |
| 5,430,627 A | 7/1995 | Nagano |
| 5,463,280 A | 10/1995 | Johnson |
| 5,467,627 A | 11/1995 | Smith et al. |
| 5,497,305 A | 3/1996 | Pastrick et al. |
| 5,497,306 A | 3/1996 | Pastrick |
| 5,499,170 A | 3/1996 | Gagne |
| 5,527,743 A | 6/1996 | Variot |
| 5,530,240 A | 6/1996 | Larson et al. |
| 5,563,422 A | 10/1996 | Nakamura et al. |
| 5,567,036 A | 10/1996 | Theobald et al. |
| 5,568,964 A | 10/1996 | Parker et al. |
| 5,570,272 A | 10/1996 | Variot |
| 5,572,812 A | 11/1996 | Mastuoka |
| 5,578,839 A | 11/1996 | Nakamura et al. |
| 5,613,751 A | 3/1997 | Parker et al. |
| 5,617,297 A | 4/1997 | Lo et al. |
| 5,618,096 A | 4/1997 | Parker et al. |
| 5,632,551 A | 5/1997 | Roney et al. |
| 5,641,221 A | 6/1997 | Schindele et al. |
| 5,649,756 A | 7/1997 | Adams et al. |
| 5,652,434 A | 7/1997 | Nakamura et al. |
| 5,669,698 A | 9/1997 | Valdman et al. |
| 5,669,699 A | 9/1997 | Pastrick et al. |
| 5,669,704 A | 9/1997 | Pastrick |
| 5,671,996 A | 9/1997 | Bos et al. |
| 5,673,994 A | 10/1997 | Fant, Jr. et al. |
| 5,680,245 A | 10/1997 | Lynam |
| 5,708,428 A | 1/1998 | Phillips |
| 5,722,281 A | 3/1998 | Yasuda et al. |
| 5,734,182 A | 3/1998 | Nakamura et al. |
| 5,746,497 A | 5/1998 | Machida |
| 5,747,832 A | 5/1998 | Nakamura et al. |
| 5,752,766 A | 5/1998 | Bailey et al. |
| 5,765,940 A | 6/1998 | Levy et al. |
| 5,786,665 A | 7/1998 | Ohtuki et al. |
| 5,803,579 A | 9/1998 | Turnbull et al. |
| 5,806,965 A | 9/1998 | Deese |
| 5,848,837 A | 12/1998 | Gustafson |
| 5,868,116 A | 2/1999 | Betts et al. |
| 5,876,107 A | 3/1999 | Parker et al. |
| 5,877,558 A | 3/1999 | Nakamura et al. |
| 5,880,486 A | 3/1999 | Nakamura et al. |
| 5,894,686 A | 4/1999 | Parker et al. |
| 5,895,115 A | 4/1999 | Parker et al. |
| 5,909,037 A | 6/1999 | Rajkomar et al. |
| 5,915,830 A | 6/1999 | Dickson et al. |
| 5,921,652 A | 7/1999 | Parker et al. |
| 5,921,660 A | 7/1999 | Yu |
| 5,927,845 A | 7/1999 | Gustafson et al. |
| 5,934,798 A | 8/1999 | Roller et al. |
| 5,938,321 A | 8/1999 | Bos et al. |
| 5,944,414 A | 8/1999 | Nishitani et al. |
| 5,945,688 A | 8/1999 | Kasahara et al. |
| 5,947,588 A | 9/1999 | Huang |
| 5,951,349 A | 9/1999 | Larose et al. |
| 5,998,925 A | 12/1999 | Shimizu et al. |
| 6,000,287 A | 12/1999 | Menzel |
| 6,005,210 A | 12/1999 | Chien |
| 6,030,089 A | 2/2000 | Parker et al. |
| 6,045,240 A | 4/2000 | Hockstein |
| 6,049,463 A | 4/2000 | O'Malley et al. |
| 6,070,998 A | 6/2000 | Jennings et al. |
| 6,079,838 A | 6/2000 | Parker et al. |
| 6,082,870 A | 7/2000 | George |
| 6,097,501 A | 8/2000 | Hayashi et al. |
| 6,113,247 A | 9/2000 | Adams et al. |
| 6,113,248 A | 9/2000 | Mistopoulos et al. |
| 6,124,886 A | 9/2000 | DeLine et al. |
| 6,139,172 A | 10/2000 | Bos et al. |
| 6,152,575 A | 11/2000 | Montanino |
| 6,152,590 A | 11/2000 | Furst et al. |
| 6,158,867 A | 12/2000 | Parker et al. |
| 6,158,882 A | 12/2000 | Bischoff, Jr. |
| 6,162,381 A | 12/2000 | Onishi et al. |
| 6,164,805 A | 12/2000 | Hulse |
| 6,170,313 B1 | 1/2001 | Vasseur et al. |
| 6,190,026 B1 | 2/2001 | Moore |
| 6,204,512 B1 | 3/2001 | Nakamura et al. |
| 6,215,133 B1 | 4/2001 | Nakamura et al. |
| 6,220,722 B1 | 4/2001 | Begemann |
| 6,234,648 B1 | 5/2001 | Borner et al. |
| 6,244,734 B1 | 6/2001 | Hulse |
| 6,255,613 B1 | 7/2001 | Yang |
| 6,276,822 B1 | 8/2001 | Bedrosian et al. |
| 6,283,612 B1 | 9/2001 | Hunter |
| 6,347,880 B1 | 2/2002 | Furst et al. |
| 6,347,881 B1 | 2/2002 | Furst et al. |
| 6,357,902 B1 | 3/2002 | Horowitz |
| 6,371,636 B1 | 4/2002 | Wesson |
| 6,402,570 B2 | 6/2002 | Soga et al. |
| 6,404,131 B1 | 6/2002 | Kanano et al. |
| 6,412,973 B1 | 7/2002 | Bos et al. |
| 6,419,306 B2 | 7/2002 | Sano et al. |
| 6,461,017 B2 | 10/2002 | Selkee |
| 6,469,323 B1 | 10/2002 | Nakamura et al. |
| 6,483,623 B1 | 11/2002 | Maruyama |
| 6,531,324 B2 | 3/2003 | Hsu et al. |
| 6,531,328 B1 | 3/2003 | Chen |
| 6,536,923 B1 | 3/2003 | Merz |
| 6,580,228 B1 | 6/2003 | Chen et al. |
| 6,583,550 B2 | 6/2003 | Isawa et al. |
| 6,595,671 B2 | 7/2003 | Lefebyre et al. |
| 6,598,996 B1 | 7/2003 | Lodhie |
| 6,604,834 B2 | 8/2003 | Kalana |
| 6,614,741 B1 * | 9/2003 | Hesselink et al. ............ 369/103 |

(56) References Cited

U.S. PATENT DOCUMENTS

| | | |
|---|---|---|
| 6,616,313 B2 | 9/2003 | Fuerst |
| 6,617,786 B1 | 9/2003 | Centofante |
| 6,653,572 B2 | 11/2003 | Ishiwa et al. |
| 6,659,632 B2 | 12/2003 | Chen |
| 6,667,782 B1 | 12/2003 | Taira et al. |
| 6,669,267 B1 | 12/2003 | Lynam et al. |
| 6,673,292 B1 | 1/2004 | Gustafson et al. |
| 6,682,331 B1 | 1/2004 | Peh et al. |
| 6,683,250 B2 | 1/2004 | Luettgen et al. |
| 6,709,132 B2 | 3/2004 | Ishibashi |
| 6,709,137 B1 | 3/2004 | Glovak et al. |
| 6,724,543 B1 | 4/2004 | Chinniah et al. |
| 6,726,502 B1 | 4/2004 | Hayes |
| 6,729,055 B2 | 5/2004 | Chou |
| 6,739,733 B1 | 5/2004 | Lamke et al. |
| 6,739,744 B2 | 5/2004 | Williams et al. |
| 6,755,547 B2 | 6/2004 | Parker |
| 6,757,969 B1 | 7/2004 | Chan |
| 6,786,625 B2 | 9/2004 | Wesson |
| 6,793,371 B2 | 9/2004 | Lamke et al. |
| 6,793,374 B2 | 9/2004 | Begemann |
| 6,812,481 B2 | 11/2004 | Matsumura et al. |
| 6,814,474 B2 | 11/2004 | Groeller |
| 6,828,170 B2 | 12/2004 | Roberts et al. |
| 6,848,818 B2 | 2/2005 | Huizenga |
| 6,860,628 B2 | 3/2005 | Robertson et al. |
| 6,866,394 B1 | 3/2005 | Hutchins et al. |
| 6,874,925 B2 | 4/2005 | Page et al. |
| 6,889,456 B2 | 5/2005 | Shibata et al. |
| 6,899,449 B2 | 5/2005 | Hatagishi et al. |
| 6,907,643 B2 | 6/2005 | Koops et al. |
| 6,910,783 B2 | 6/2005 | Mezei et al. |
| 6,919,629 B2 | 7/2005 | Merado |
| 6,921,926 B2 | 7/2005 | Hsu |
| 6,930,332 B2 | 8/2005 | Hashimoto et al. |
| 6,942,360 B2 | 9/2005 | Chou et al. |
| 6,949,709 B1 | 9/2005 | Barat et al. |
| 6,971,758 B2 | 12/2005 | Inui et al. |
| 6,979,100 B2 | 12/2005 | Reiff et al. |
| 6,982,518 B2 | 1/2006 | Chou et al. |
| 6,988,819 B2 | 1/2006 | Siktberg et al. |
| 6,997,576 B1 | 2/2006 | Lodhie et al. |
| 7,040,779 B2 | 5/2006 | Lamke et al. |
| 7,048,423 B2 | 5/2006 | Stepanenko et al. |
| 7,055,997 B2 | 6/2006 | Baek |
| 7,060,542 B2 | 6/2006 | Nakajima et al. |
| 7,070,304 B2 | 7/2006 | Imai |
| 7,071,523 B2 | 7/2006 | Yano et al. |
| 7,080,446 B2 | 7/2006 | Baba et al. |
| 7,081,644 B2 | 7/2006 | Flaherty et al. |
| 7,083,311 B2 | 8/2006 | Schreck et al. |
| 7,086,756 B2 | 8/2006 | Maxik |
| 7,102,213 B2 | 9/2006 | Sorg |
| 7,114,830 B2 | 10/2006 | Robertson et al. |
| 7,118,646 B2 | 10/2006 | Hunkeler |
| 7,119,422 B2 | 10/2006 | Chin |
| 7,128,442 B2 | 10/2006 | Lee et al. |
| 7,140,751 B2 | 11/2006 | Lin |
| 7,160,015 B2 | 1/2007 | Parker |
| 7,172,314 B2 | 2/2007 | Currie et al. |
| 7,175,324 B2 | 2/2007 | Kwon |
| 7,195,381 B2 | 3/2007 | Lynam et al. |
| 7,199,438 B2 | 4/2007 | Appelt et al. |
| 7,213,952 B2 | 5/2007 | Iwai |
| 7,220,029 B2 | 5/2007 | Bynum et al. |
| 7,224,001 B2 | 5/2007 | Cao |
| 7,226,189 B2 | 6/2007 | Lee et al. |
| 7,241,031 B2 | 7/2007 | Sloan et al. |
| 7,249,869 B2 | 7/2007 | Takahashi et al. |
| 7,262,489 B2 | 8/2007 | Shoji |
| 7,265,322 B2 | 9/2007 | Aegenheyster et al. |
| 7,267,407 B1 | 9/2007 | Demick et al. |
| 7,268,368 B1 | 9/2007 | Knapp |
| 7,270,454 B2 | 9/2007 | Amano |
| 7,280,288 B2 | 10/2007 | Loh et al. |
| 7,282,785 B2 | 10/2007 | Yoshida |
| 7,301,176 B2 | 11/2007 | Abe et al. |
| 7,333,257 B2 | 2/2008 | Reynolds et al. |
| 7,357,525 B2 | 4/2008 | Doyle |
| 7,374,305 B2 | 5/2008 | Parker |
| 7,380,961 B2 | 6/2008 | Moriyama et al. |
| 7,384,177 B2 | 6/2008 | Parker |
| 7,384,817 B2 | 6/2008 | Taklar et al. |
| 7,387,420 B2 | 6/2008 | Ogino et al. |
| 7,402,270 B2 | 7/2008 | Mercado |
| 7,434,974 B2 | 10/2008 | Parker |
| 7,448,778 B2 | 11/2008 | Lin |
| 7,467,887 B2 | 12/2008 | Parker |
| 7,500,771 B2 | 3/2009 | Schmierer |
| 7,712,933 B2 | 5/2010 | Fleischmann |
| 7,815,339 B2 | 10/2010 | Veenstra et al. |
| 7,837,359 B2 | 11/2010 | Danek et al. |
| 8,004,860 B2 | 8/2011 | Salzman |
| 8,049,839 B2 | 11/2011 | Han et al. |
| 8,053,977 B2 | 11/2011 | Lifka et al. |
| 8,215,816 B2 | 7/2012 | Parker |
| 2002/0003700 A1 | 1/2002 | Selkee |
| 2002/0004251 A1 | 1/2002 | Roberts et al. |
| 2002/0060489 A1 | 5/2002 | Richard |
| 2002/0089849 A1 | 7/2002 | Lamke et al. |
| 2002/0105812 A1 | 8/2002 | Zimmerman et al. |
| 2002/0131261 A1 | 9/2002 | Inui et al. |
| 2003/0160256 A1 | 8/2003 | Durocher et al. |
| 2004/0056265 A1 | 3/2004 | Arndt et al. |
| 2004/0114367 A1 | 6/2004 | Li |
| 2004/0180459 A1 | 9/2004 | Hsu |
| 2004/0223328 A1 | 11/2004 | Lee et al. |
| 2004/0252501 A1 | 12/2004 | Moriyama et al. |
| 2004/0265512 A1 | 12/2004 | Aengenheyster et al. |
| 2005/0007759 A1 | 1/2005 | Parker |
| 2005/0012880 A1 | 1/2005 | Yoshii et al. |
| 2005/0032259 A1 | 2/2005 | Nakajima et al. |
| 2005/0039512 A1 | 2/2005 | Lefevere |
| 2005/0117352 A1 | 6/2005 | Lin |
| 2005/0121829 A1 | 6/2005 | Spurr et al. |
| 2005/0200045 A1 | 9/2005 | Fisher |
| 2005/0206040 A1 | 9/2005 | Mercado |
| 2005/0207176 A1 | 9/2005 | Johnson et al. |
| 2005/0210672 A1 | 9/2005 | Reynolds et al. |
| 2005/0213351 A1 | 9/2005 | Yang |
| 2005/0214968 A1 | 9/2005 | Waiti et al. |
| 2005/0269587 A1 | 12/2005 | Loh et al. |
| 2005/0286840 A1 | 12/2005 | Ho et al. |
| 2006/0040094 A1 | 2/2006 | Mizuno et al. |
| 2006/0043607 A1 | 3/2006 | Matsura et al. |
| 2006/0120085 A1 | 6/2006 | Hsieh et al. |
| 2006/0120097 A1 | 6/2006 | Schmierer |
| 2006/0157725 A1 | 7/2006 | Flaherty |
| 2006/0187652 A1 | 8/2006 | Doyle |
| 2006/0198155 A1 | 9/2006 | Nickola et al. |
| 2006/0215422 A1 | 9/2006 | Laizure, Jr. et al. |
| 2006/0220049 A1 | 10/2006 | Flaherty et al. |
| 2006/0239037 A1 | 10/2006 | Repetto et al. |
| 2006/0245188 A1 | 11/2006 | Takenada |
| 2006/0245191 A1 | 11/2006 | Ratcliffe |
| 2006/0274554 A1 | 12/2006 | Parker |
| 2007/0029569 A1 | 2/2007 | Andrews |
| 2007/0075451 A1 | 4/2007 | Winter et al. |
| 2007/0080357 A1 | 4/2007 | Ishii |
| 2007/0097683 A1 | 5/2007 | Chikugawa |
| 2007/0103901 A1 | 5/2007 | Reid |
| 2007/0103902 A1 | 5/2007 | Hsiao |
| 2007/0117248 A1 | 5/2007 | Kunze et al. |
| 2007/0121326 A1 | 5/2007 | Nall et al. |
| 2007/0133214 A1 | 6/2007 | Maeda et al. |
| 2007/0153503 A1 | 7/2007 | Feng |
| 2007/0153549 A1 | 7/2007 | Parker |
| 2007/0166866 A1 | 7/2007 | Appelt et al. |
| 2007/0170454 A1 | 7/2007 | Andrews |
| 2007/0187710 A1 | 8/2007 | Steen et al. |
| 2007/0194333 A1 | 8/2007 | Son |
| 2007/0194336 A1 | 8/2007 | Shin et al. |
| 2007/0194337 A1 | 8/2007 | Kondo |
| 2007/0196762 A1 | 8/2007 | Maeda et al. |

(56) References Cited

U.S. PATENT DOCUMENTS

| | | | |
|---|---|---|---|
| 2007/0200127 A1 | 8/2007 | Andrews et al. | |
| 2007/0200413 A1 | 8/2007 | Demick et al. | |
| 2007/0205425 A1 | 9/2007 | Harada | |
| 2007/0217192 A1 | 9/2007 | Hiratsuka | |
| 2007/0241357 A1 | 10/2007 | Yan | |
| 2007/0241362 A1 | 10/2007 | Han et al. | |
| 2007/0257398 A1 | 11/2007 | Moncrieff | |
| 2007/0259576 A1 | 11/2007 | Brandt et al. | |
| 2007/0274648 A1 | 11/2007 | Ip | |
| 2008/0062711 A1 | 3/2008 | Veenstra et al. | |
| 2008/0066355 A1 | 3/2008 | Misawa et al. | |
| 2008/0076859 A1 | 3/2008 | Eipper et al. | |
| 2008/0102726 A2 | 5/2008 | Jeganathan et al. | |
| 2008/0106187 A1 | 5/2008 | Suzuki et al. | |
| 2008/0170405 A1 | 7/2008 | Kamiya et al. | |
| 2008/0253140 A1 | 10/2008 | Fleischmann et al. | |
| 2008/0259642 A1 | 10/2008 | Parker | |
| 2009/0154138 A1* | 6/2009 | Isoda et al. | 362/97.1 |
| 2009/0297090 A1 | 12/2009 | Bogner et al. | |
| 2010/0123858 A1 | 5/2010 | Han et al. | |
| 2010/0253225 A1 | 10/2010 | Lifka et al. | |
| 2012/0081921 A1 | 4/2012 | Parker | |

FOREIGN PATENT DOCUMENTS

| | | |
|---|---|---|
| DE | 19805771 | 8/1999 |
| DE | 10200048497 | 7/2007 |
| EP | 1657758 | 5/2006 |
| GB | 2431764 | 5/2007 |
| JP | 2058892 | 2/1990 |
| JP | 09129077 | 5/1997 |
| JP | 11220239 | 8/1999 |
| JP | 2002096680 | 4/2002 |
| JP | 2002287671 | 10/2002 |
| JP | 2003243712 | 8/2003 |
| JP | 63292690 | 5/2005 |
| JP | 2005134789 | 5/2005 |
| JP | 2005221661 | 8/2005 |
| JP | 2006062431 | 3/2006 |
| JP | 2007203873 | 8/2007 |
| KR | 20000009857 | 2/2000 |
| TW | 200702591 | 1/2007 |
| WO | 9748134 | 12/1997 |
| WO | 9750132 | 12/1997 |
| WO | 0055685 | 9/2000 |
| WO | 0055914 | 9/2000 |
| WO | 2006059828 | 6/2006 |
| WO | 2007036207 | 4/2007 |
| WO | 2007064701 | 6/2007 |
| WO | 2008024761 | 2/2008 |
| WO | 2008070697 | 2/2008 |
| WO | 2009075924 | 6/2009 |
| WO | 2009076579 | 6/2009 |
| WO | 2009103517 A1 | 8/2009 |

OTHER PUBLICATIONS

International Search Report, International Application No. PCT/US2008/076859, filed Sep. 18, 2008, (4 pages).

Korean Intellectual Property Office, "International Search Report," International Application No. PCT/US2008/086521, Jul. 23, 2009 (3 pages).

International Search Report dated Jul. 23, 2009 for Int'l Application No. PCT/US2008/086521, Int'l Filing Date Dec. 12, 2008.

European Patent Office, "Supplementary European Search Report," Jan. 19, 2001, (6 pages).

International Search Report, PCT/US/2013/045682, Sep. 26, 2013, 7 pages.

* cited by examiner

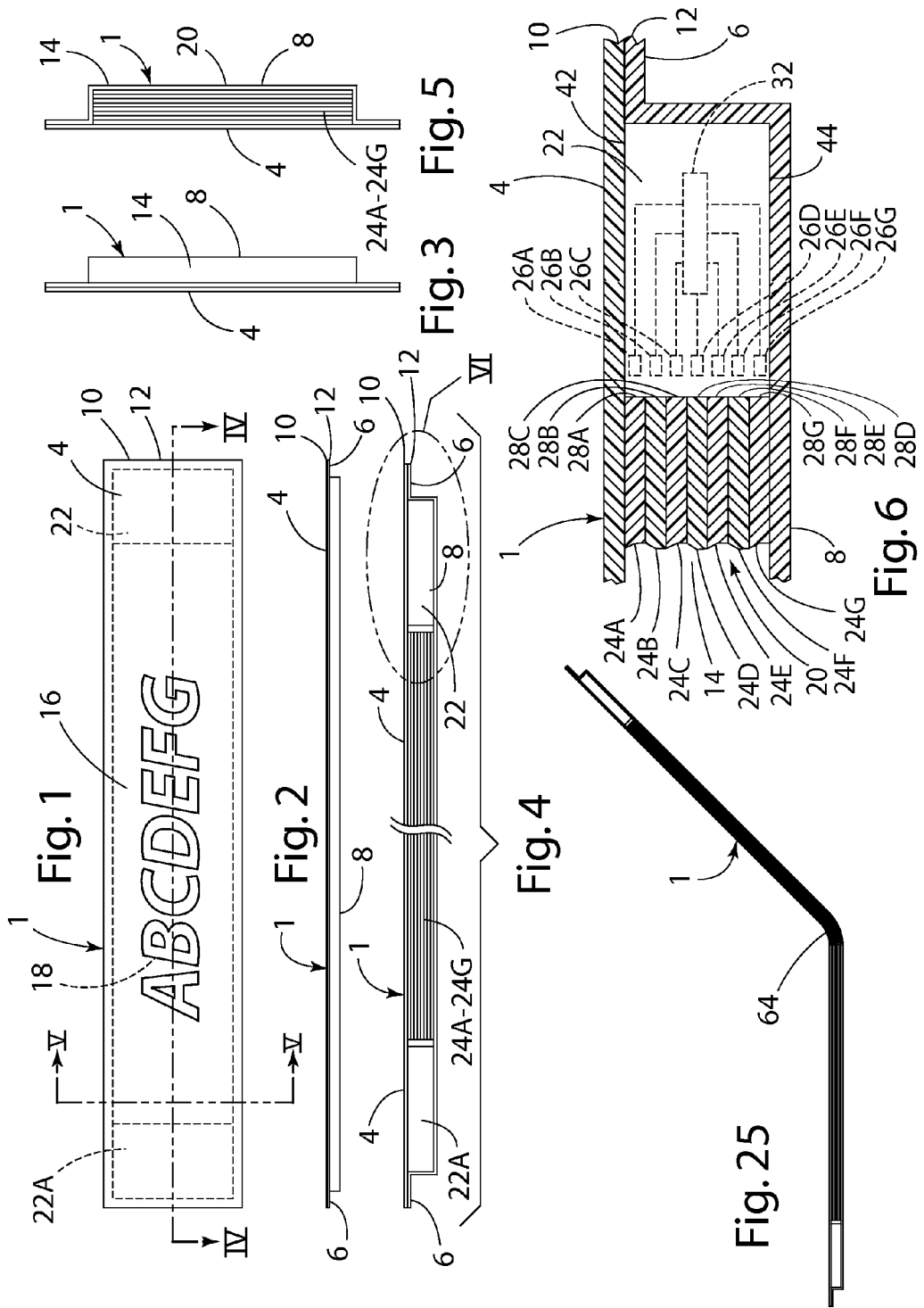

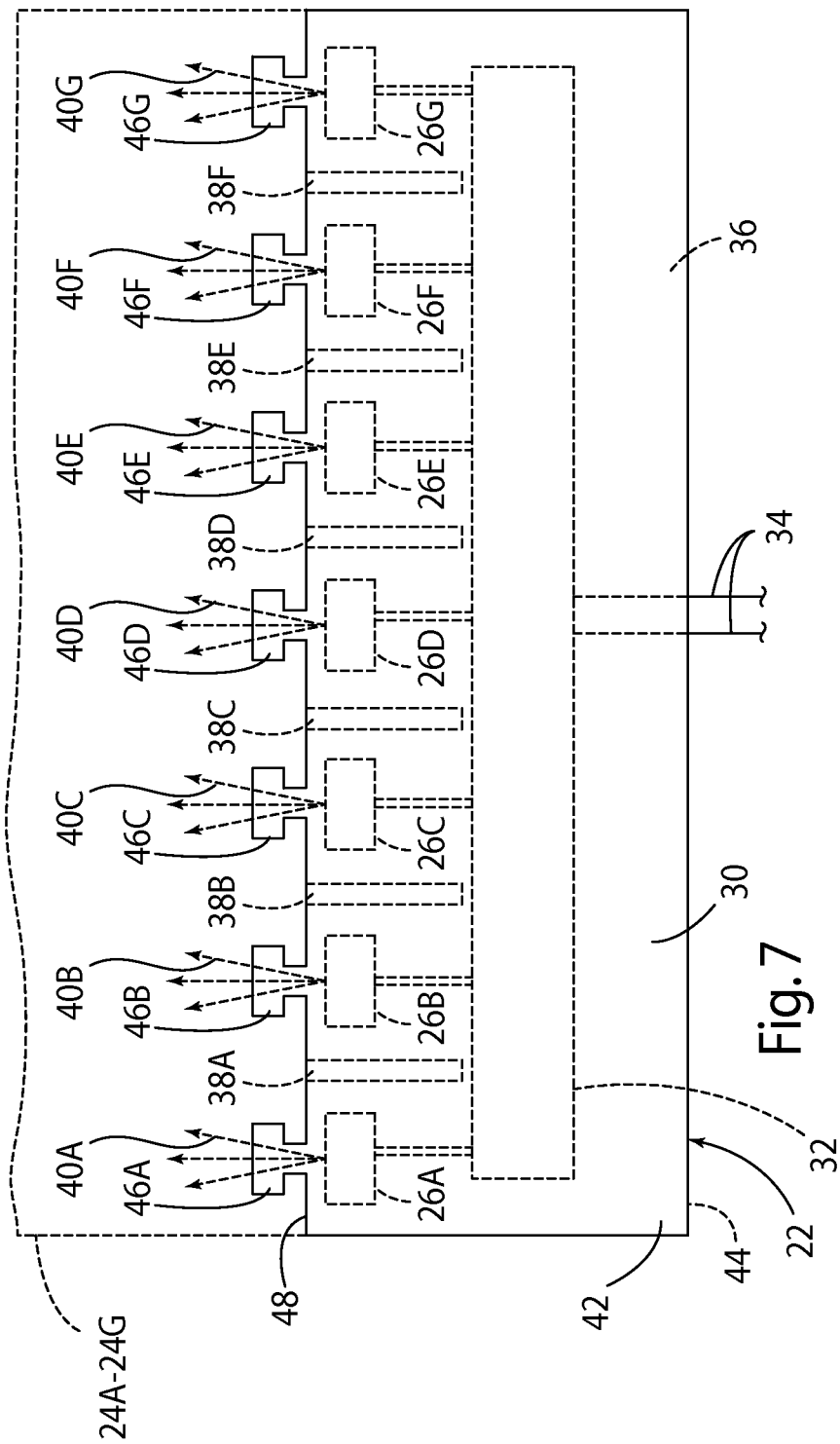

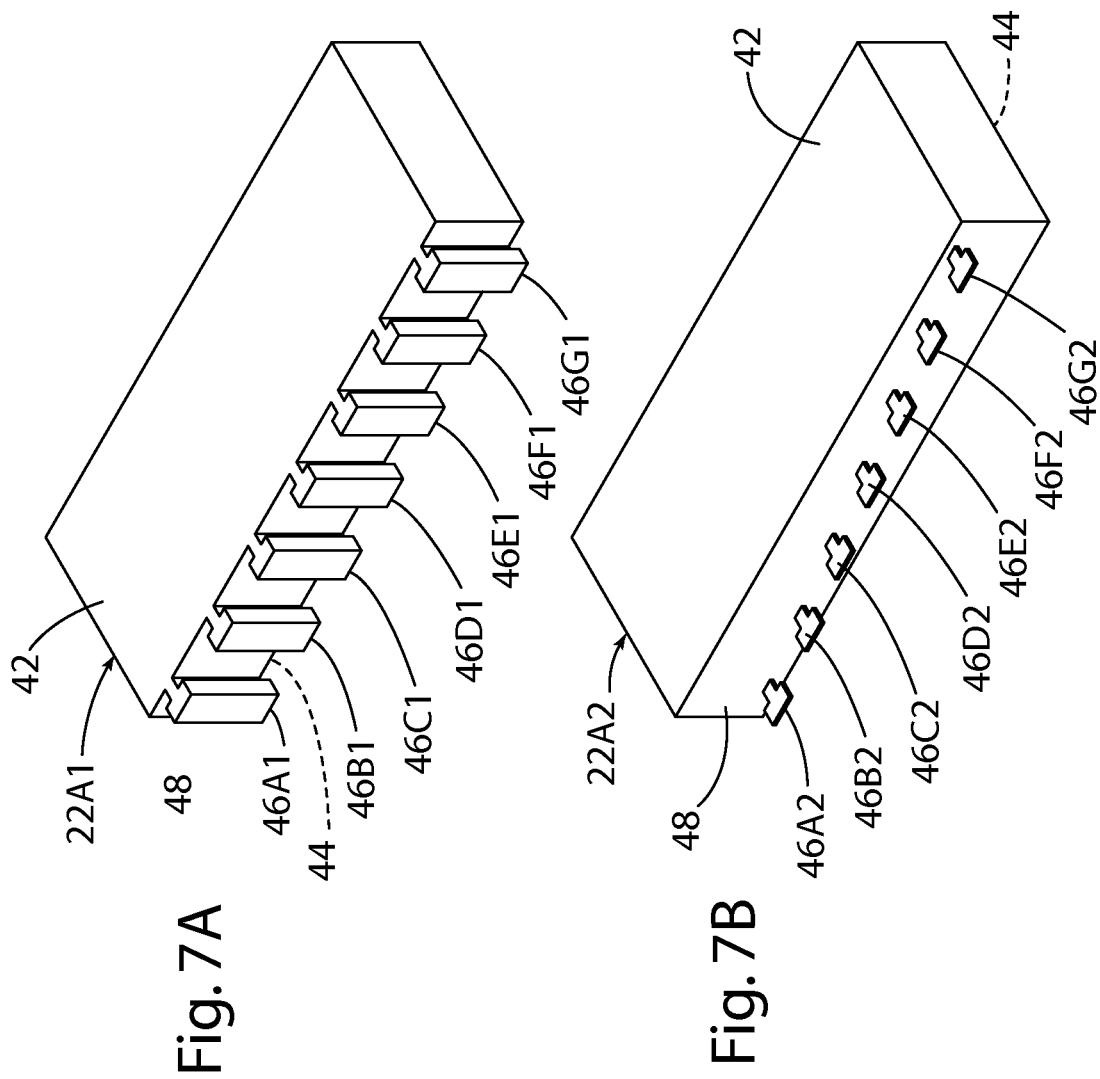

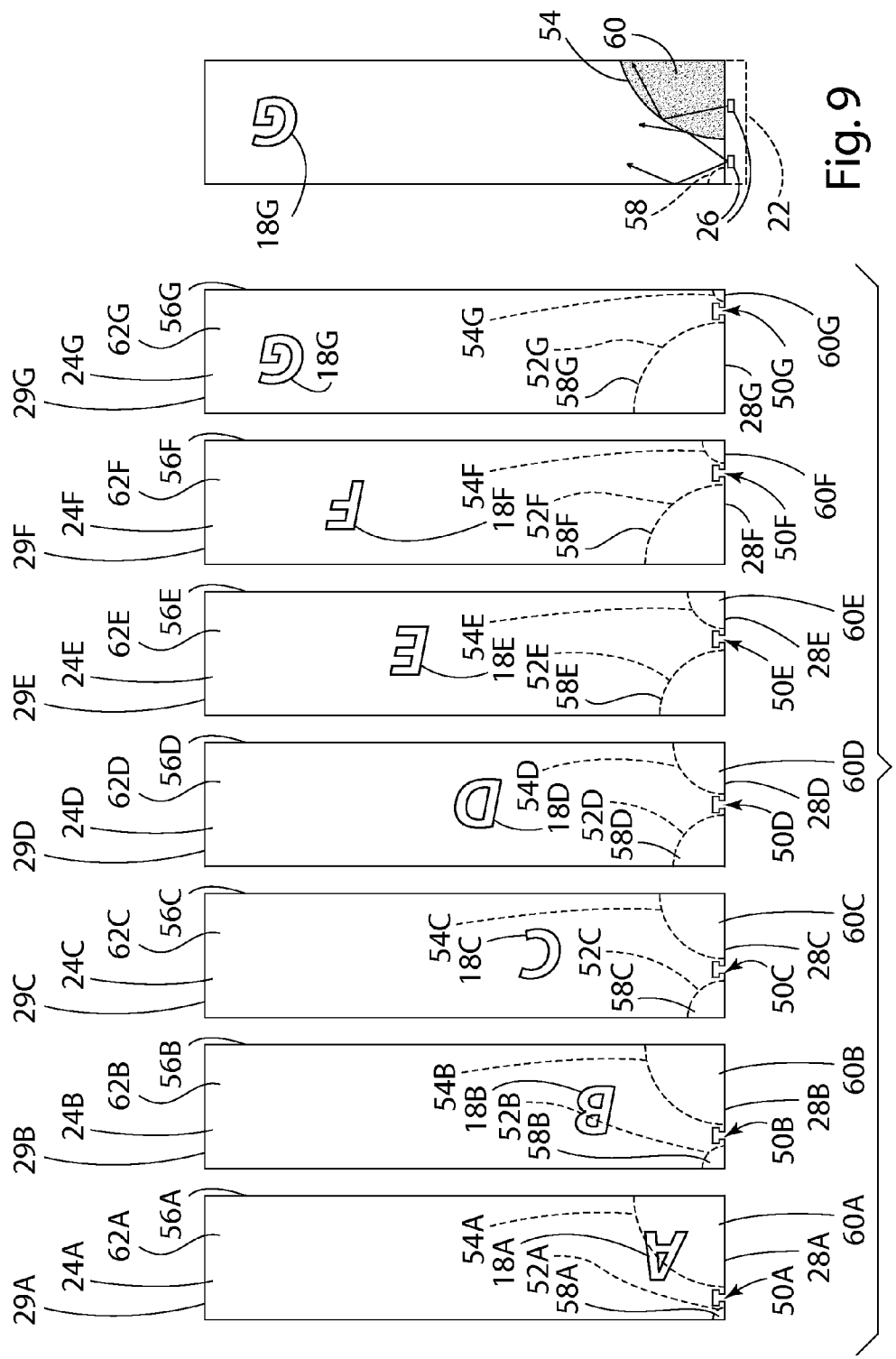

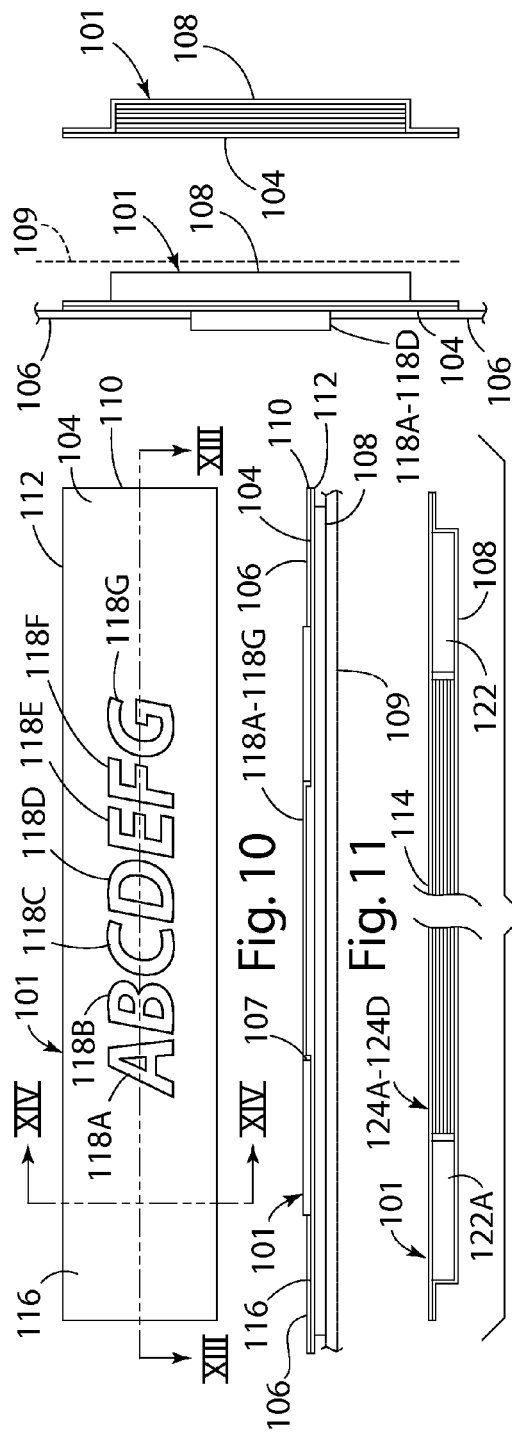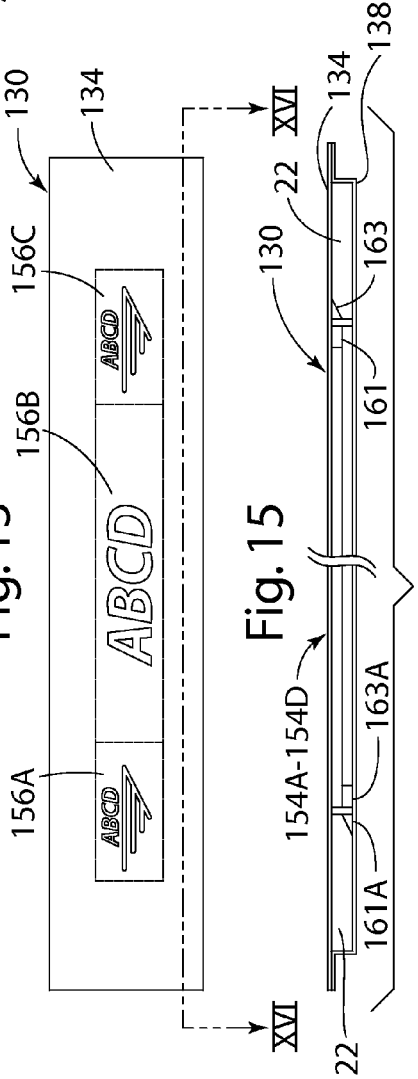

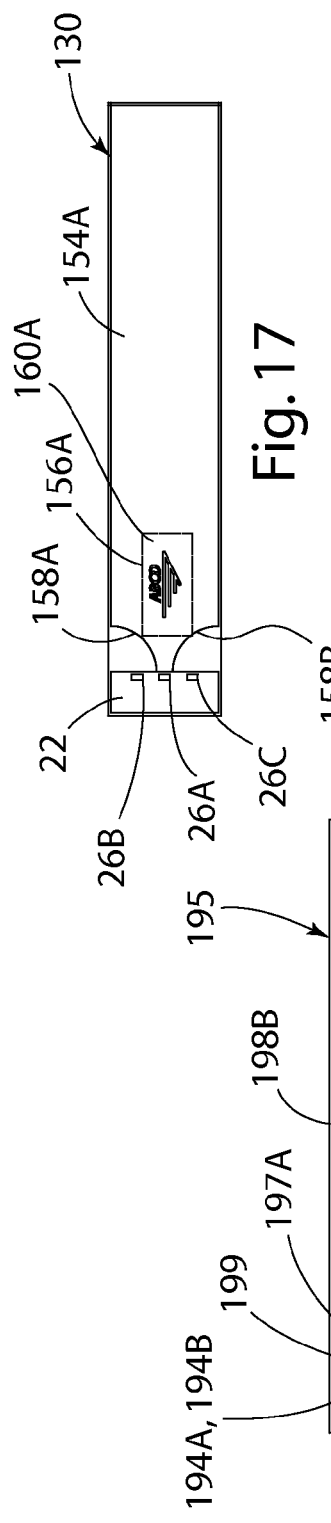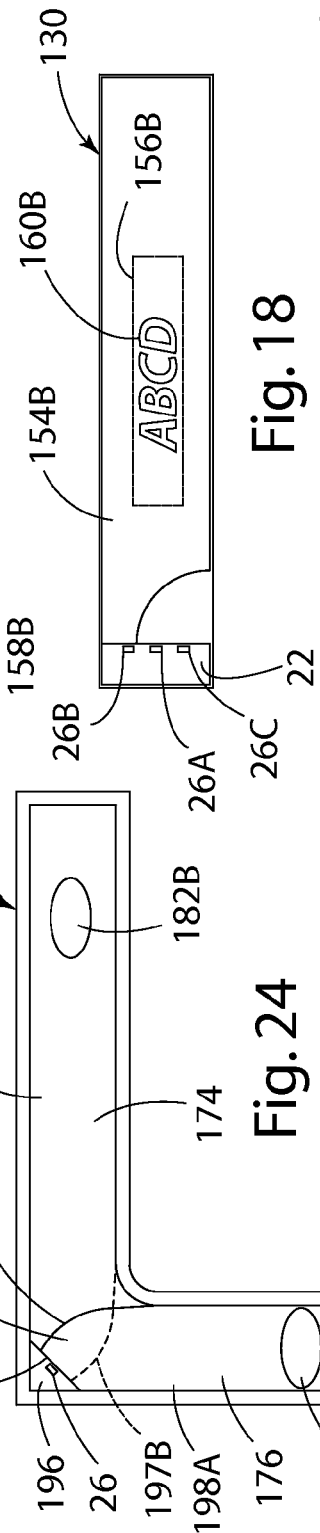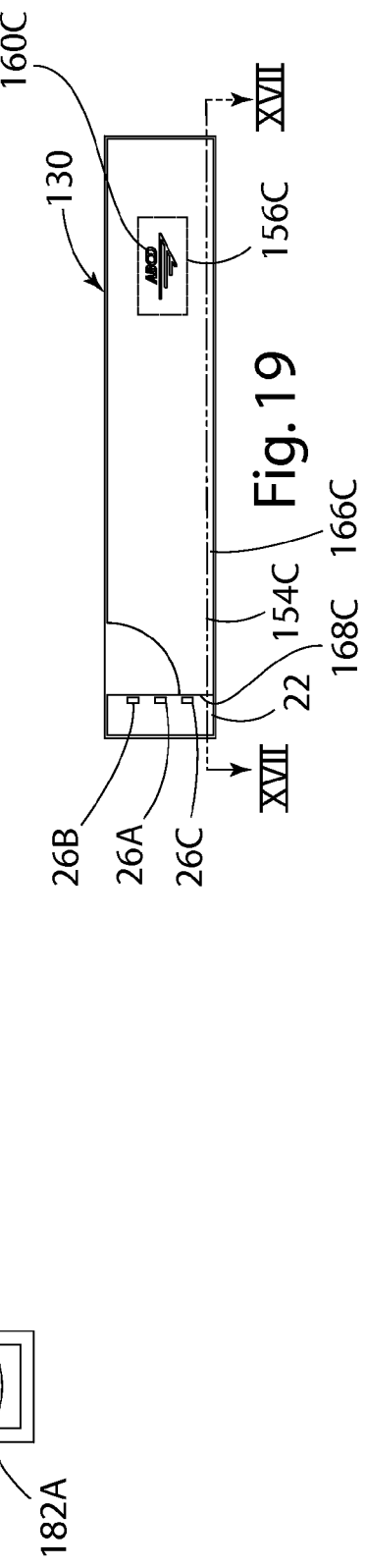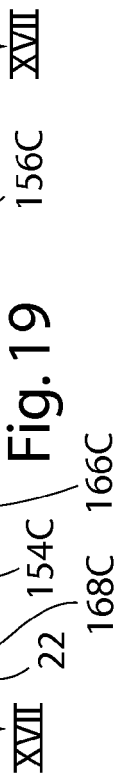

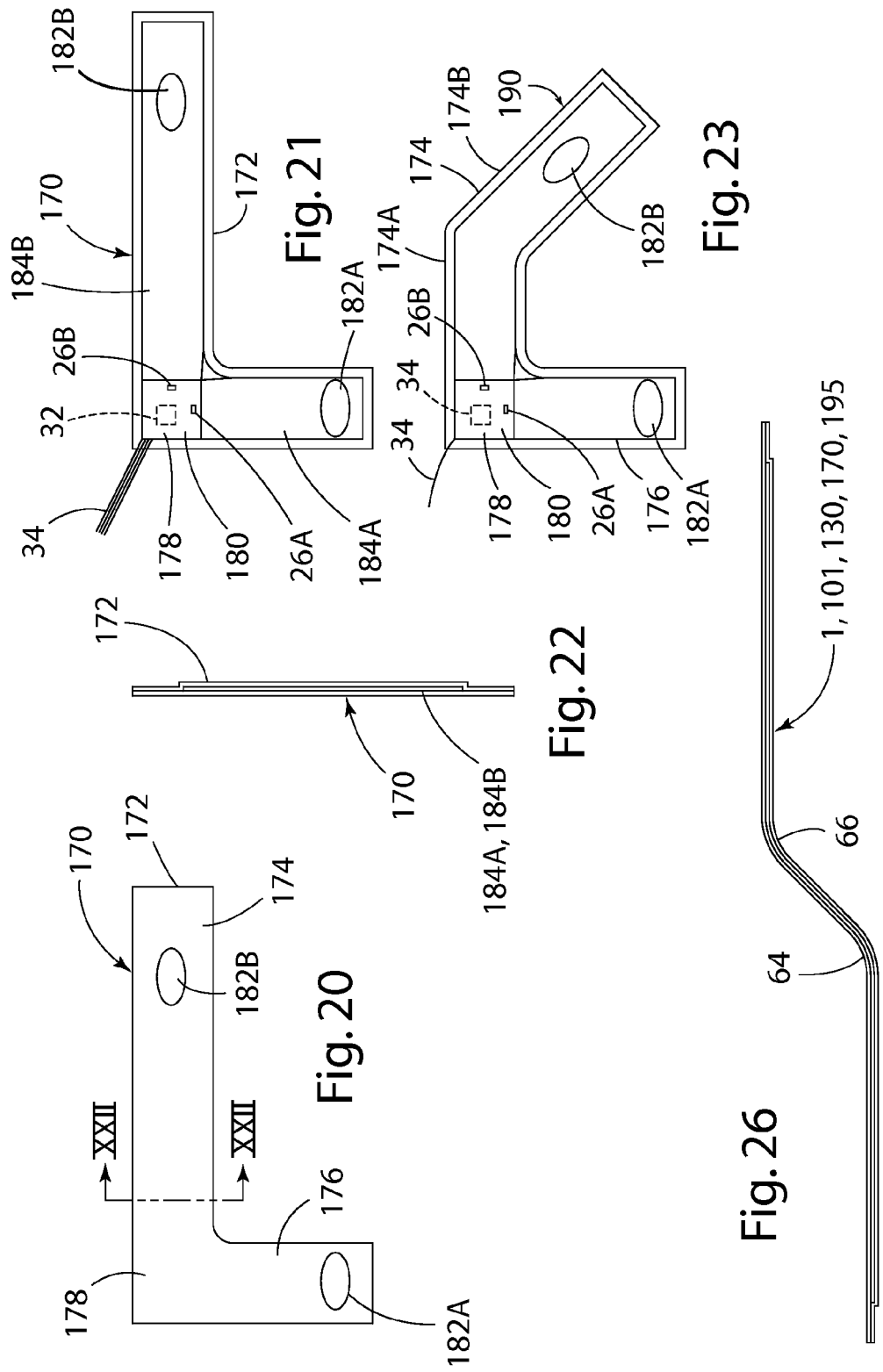

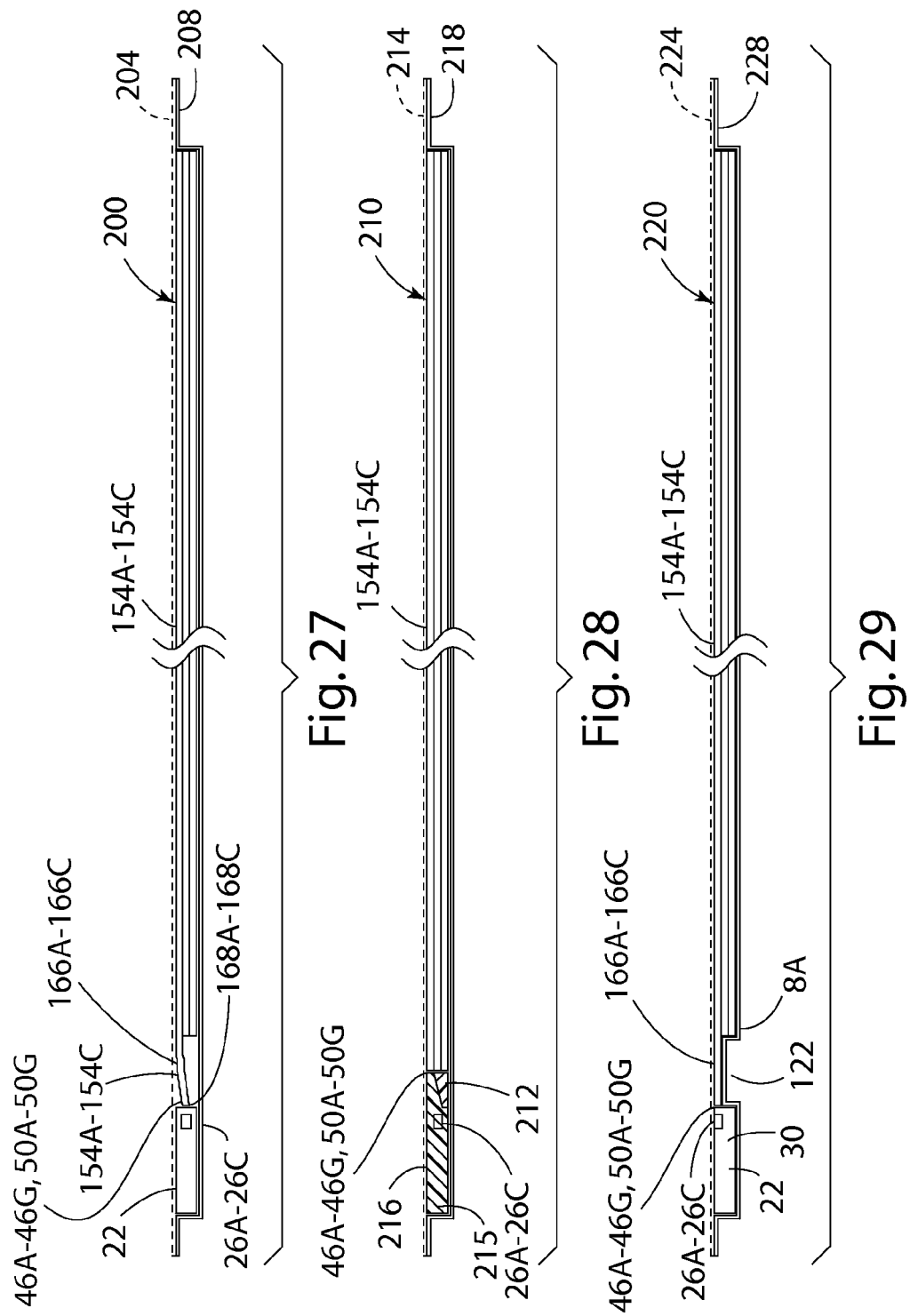

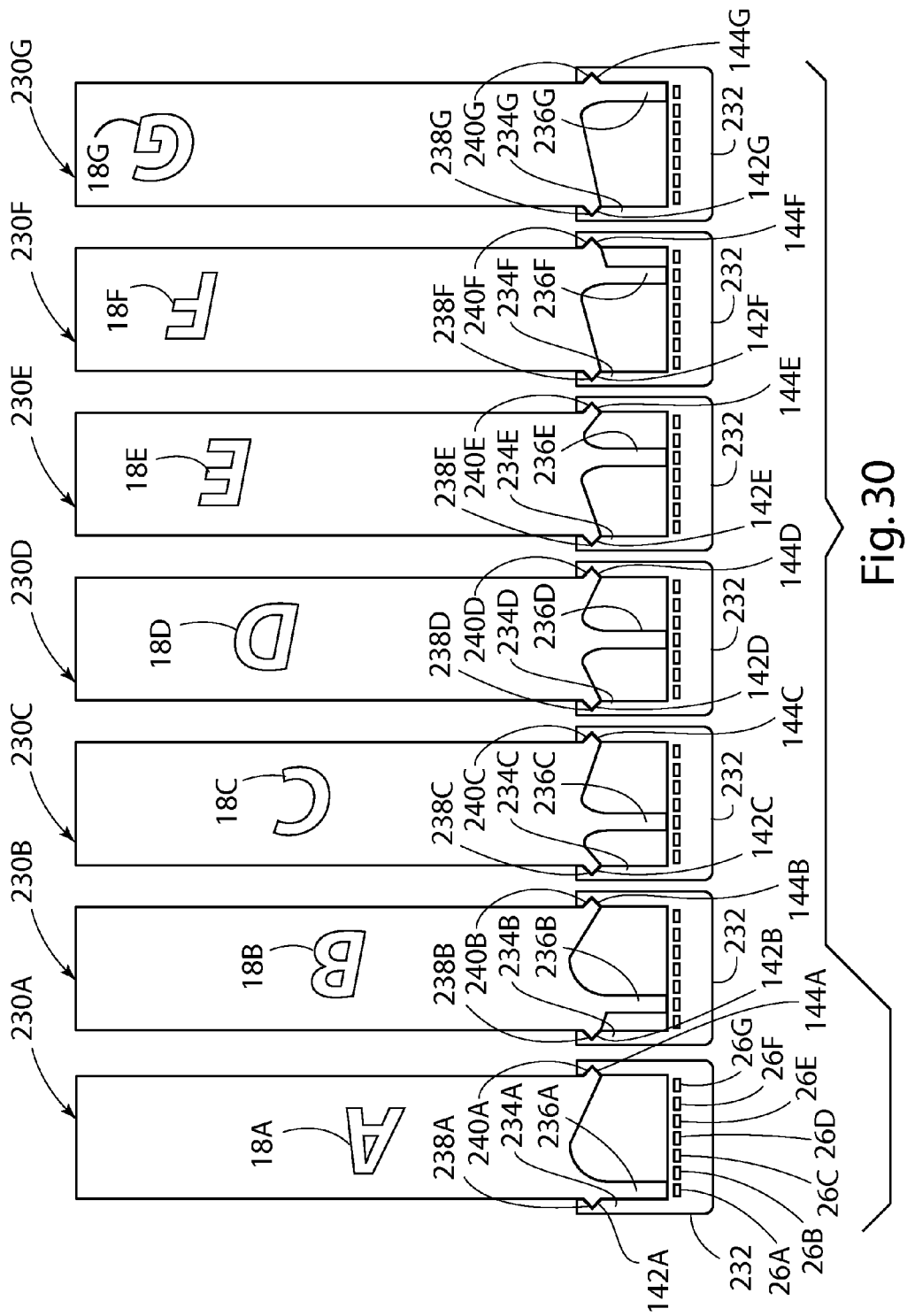

FLEXIBLE LIGHT PIPE

CROSS REFERENCE TO RELATED APPLICATION

This application claims the benefit of U.S. Provisional Application No. 61/659,051 filed on Jun. 13, 2012, entitled, FLEXIBLE LIGHT PIPE, the entire contents of which are incorporated herein by reference.

BACKGROUND OF THE INVENTION

Various types of lights and lighted accessory units have been developed for motor vehicles and the like.

U.S. Pat. No. 7,712,933 discloses lighted assemblies that include LED light sources that are encapsulated in a polymer material. The lighted assembly may comprise an LED light source that is connected to a light guide as shown in FIGS. 7-11 of the '933 patent. However, known vehicle lights may suffer from various drawbacks.

The present invention relates to a flexible, clear light pipe/lighted logo. The light pipe or logo may be curved and deformed for mounting on curved, inflexible surfaces. The light pipe or logo may also be utilized in situations where the part must actually flex like in applications, vehicle seat, floor mat or similar flexible vehicle trim component. It may also be utilized in non-automotive applications such as mouse pads, clothing, baggage, or stick on logos. The light pipe also provides independent control of illuminated areas by use of multiple LED's in one light engine, and splitting of light from one LED to multiple locations of illumination using the thickness of the light pipe and its shape to split the light as needed.

BRIEF SUMMARY OF THE INVENTION

One aspect of the present invention is a high clarity clear/transparent and flexible light pipe having a plurality of layers of light pipes. This construction permits multiple lighted areas having illumination that is individually controlled.

The flexible lighted assembly may include a light source comprising at least one LED. The LED may optionally be encapsulated in a light transmitting material. The flexible lighted assembly may also include a plurality of overlapping sheets of flexible light transmitting material. Each sheet has first and second opposite side surfaces and a peripheral edge surface extending between the first and second opposite side surfaces. The sheets receive light from the light source and internally reflect the light to thereby guide the light through the sheets. The first and second side surfaces of each sheet includes a reflective area that reflects a substantial majority of the light from the LED internally. At least the first side surface of the sheets includes a light emitting area that permits escape of light from within the sheet whereby the light emitting area can be illuminated by the LED.

Another aspect of the present invention is a method of making a flexible lighted assembly. The method includes providing a light source and forming a plurality of light guides from thin sheets of light transmitting polymer material. The thin sheets of light transmitting polymer material have first and second opposite side faces that are generally smooth and internally reflect light introduced at edges of the sheets. The method includes treating at least a portion of the first side face of each sheet to form light emitting surface features defining light emitting areas. The method further includes overlapping portions of the light guides and operably connecting the light source to the light guides whereby light from the light source is transmitted through the light guides and illuminates the light emitting areas.

These and other features, advantages, and objects of the present invention will be further understood and appreciated by those skilled in the art by reference to the following appended drawings.

BRIEF DESCRIPTION OF THE DRAWINGS

FIG. 1 is a plan view of a lighted assembly according to one aspect of the present invention;

FIG. 2 is a side elevational view of the lighted assembly of FIG. 1;

FIG. 3 is an end view of the lighted assembly of FIG. 1;

FIG. 4 is cross sectional view of the lighted assembly of FIG. 1 taken along the line IV-IV;

FIG. 5 is a cross sectional view of the lighted assembly of FIG. 1 taken along the line V-V;

FIG. 6 is a partially fragmentary enlarged view of a portion of the lighted assembly of FIG. 4;

FIG. 7 is a partially schematic view of a portion of the light assembly of FIG. 1;

FIG. 7A is an isometric view of a light source/engine according to one aspect of the present invention;

FIG. 7B is an isometric view of a light source/engine according to one aspect of the present invention;

FIG. 8 is an exploded view of the individual light guides of the assembly of FIG. 1;

FIG. 9 is top plan view of the light guides and light engine of the light assembly of FIG. 1;

FIG. 10 is a top plan view of a light assembly according to another aspect of the present invention;

FIG. 11 is a side view of the light assembly of FIG. 10;

FIG. 12 is an end view of the light assembly of FIG. 10;

FIG. 13 is partially fragmentary cross sectional view of the light assembly of FIG. 10 taken along the line XII-XIII;

FIG. 14 is a cross sectional view of the light assembly of FIG. 10 taken along the line XIV-XIV;

FIG. 15 is a top plan view of a light assembly according to another aspect of the present invention;

FIG. 16 is a partially fragmentary cross sectional view of the light assembly of FIG. 15 taken along the line XVI-XVI;

FIG. 17 is a partial cut away of the lighting assembly of FIG. 15 showing a first light guide/layer;

FIG. 18 is a partial cut away of the lighting assembly of FIG. 15 showing a second optical light guide/layer;

FIG. 19 is a partial cut away of the lighting assembly of FIG. 15 showing a third light guide/layer;

FIG. 20 is a top plan view of a flexible lighted assembly according to another aspect of the present invention;

FIG. 21 is a view of the flexible lighted assembly of FIG. 20 showing the internal components;

FIG. 22 is a cross sectional view of the flexible lighted assembly of FIG. 20 taken along the line XXII-XXII;

FIG. 23 is top plan view of a flexible lighted assembly according to another aspect of the present invention;

FIG. 24 is a top plan view of a flexible lighted assembly according to another aspect of the present invention;

FIG. 25 is a cross sectional view of a flexible light assembly according to the present invention wherein the assembly is bent at one location;

FIG. 26 is a cross sectional view of a flexible light assembly according to the present invention wherein the assembly is bent at two locations;

FIG. 27 is a partially fragmentary cross sectional view of a flexible light assembly according to another aspect of the present invention;

FIG. 28 is a partially fragmentary cross sectional view of a flexible light assembly according to another aspect of the present invention;

FIG. 29 is a partially fragmentary cross sectional view of a flexible light assembly according to another aspect of the present invention;

FIG. 30 is an exploded plan view showing a plurality of light guides according to another aspect of the present invention.

DETAILED DESCRIPTION OF PREFERRED EMBODIMENTS

Figure 31:
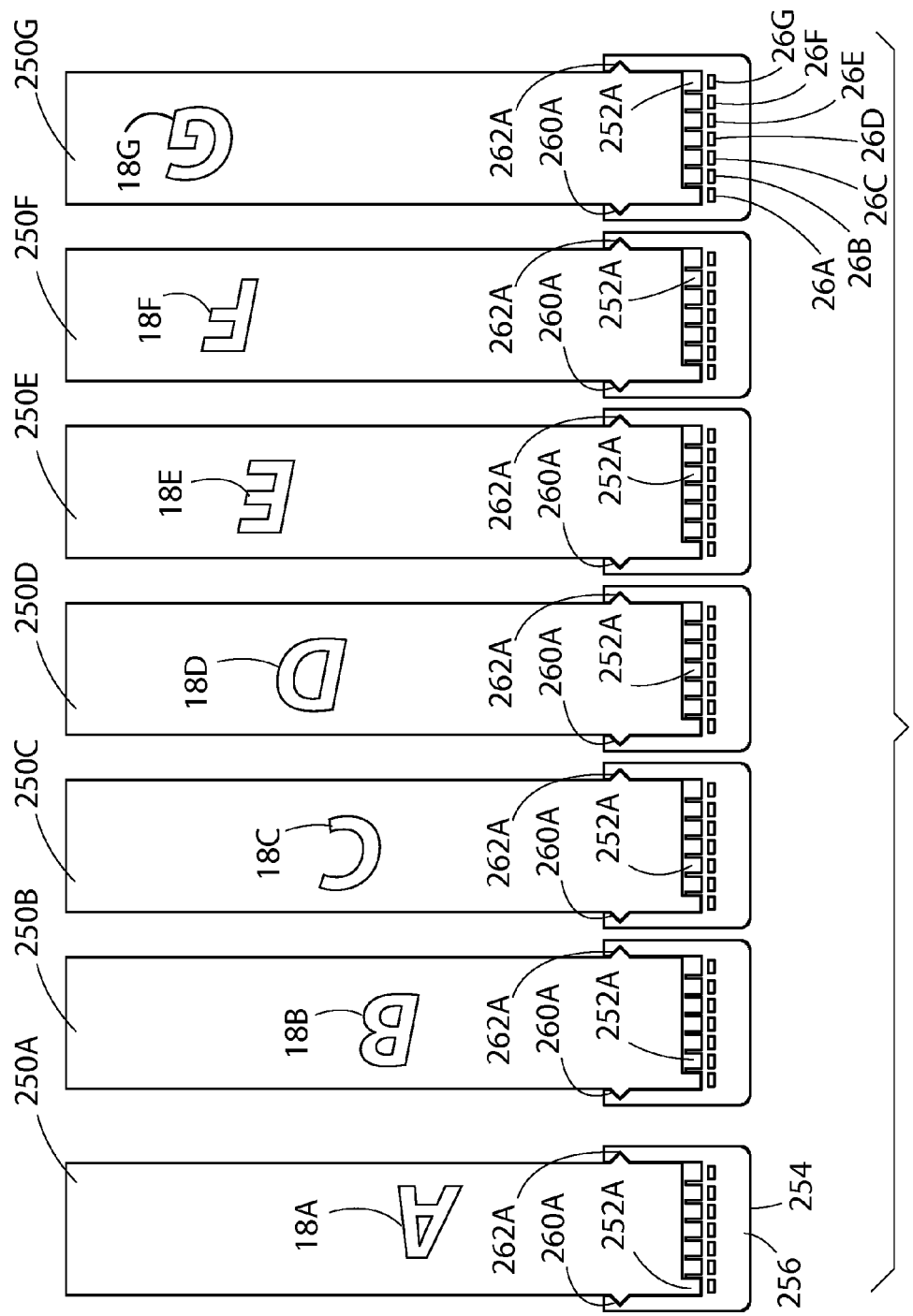
FIG. 31 is an exploded plan view showing a plurality of light guides according to another aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-5, a flexible lighted assembly 1 according to one aspect of the present invention includes a generally planar outer sheet or layer 4 that is secured to flanges 6 of a tray or housing 8. (See also FIG. 6). In the illustrated example, the outer sheet or layer 4 has a rectangular perimeter 10 that is the same size and shape as perimeter 12 of flanges 6 of tray 8. However, the perimeters 10 and 12 may have other shapes as required for a particular application. The outer layer 4 and the tray 8 may be formed from thermoplastic polymer or other suitable materials. As discussed below, one or both of the outer layer 4 and tray 8 may be made from an elastomeric material to permit flexing of the lighted assembly 1. The outer layer 4 may be adhesively secured to the flange 6 of tray 8 to form a watertight interior space 14. The outer sheet 4 may also be secured to flanges 6 of tray 8 utilizing heat to melt and interconnect the material of outer layer 4 to the material of tray 8.

The outer sheet or layer 4 may be made from a transparent polymer material that has been selectively coated or otherwise treated to form a first area 16 that does not transmit light, and to form a plurality of second areas 18 that transmit light therethrough. The first areas 16 may comprise ink, paint, or other layer of opaque material that blocks transmission of light. The second areas 18 may form letters, numbers, designs, or other desired shapes. The areas 18 of layer 4 may be substantially smooth, or the areas 18 may have a rough ("frosted") surface. The areas 18 of layer 4 may be coated with a translucent colored ink or other suitable material to provide a desired lighted color. As discussed in more detail below, an LED light distribution assembly 20 is positioned within interior space 14 and illuminates the second areas 18.

With reference to FIG. 6, the LED light distribution assembly 20 includes an LED light engine 22 having one or more LEDs 26A-26G that provide light to a plurality of individual light guides 24A-24G, respectively. The light guides 24A-24G comprise individual sheets of polymer material (see also FIG. 8) that are stacked on top of one another in alignment with the LEDs 26A-26G such that light from the LEDs 26A-26G is transmitted into the edges of the light guides 24A-24G at ends 28A-28G, respectively.

With further reference to FIGS. 7 and 8, the LEDs 26A-26G may comprise white LEDs that are encapsulated in a body 30 that is molded from a transparent thermoplastic polymer material. The LEDs 26A-26G may be operably connected to an electrical circuit 32 that is also encapsulated in the polymer body 30. One or more electrical lines 34 may provide power to the electrical circuit 32 and LEDs 26A-26G. The LEDs 26A-26G, electrical circuit elements 32, and other related components (not shown) may be molded into the polymer body 30 utilizing the processes disclosed in U.S. Pat. No. 7,909,482 to Veenstra et al, issued Mar. 22, 2011 and/or U.S. Pat. No. 8,230,575, to Veenstra et al., issued Jul. 31, 2012 the entire contents of each being incorporated herein by reference.

The polymer body 30 may comprise a main portion 36 comprising a transparent polymer material, and a plurality of secondary portions 38a-38f that comprise an opaque, light-blocking polymer material. The secondary portions 38 are disposed between the LEDs 26A-26F to prevent light 40A-40G from LEDs 26A-26G, respectively, from entering the other light guides 24A-24G. The secondary portions 38 may comprise walls or layers of material extending between the upper surface 42 and lower surface 44 (see also FIG. 6) of polymer body 30. The secondary portions 38A-38F may be formed utilizing a secondary injection molding process. For example, transparent polymer material may be molded in a first mold cavity to form main portion 36, leaving open areas in the regions corresponding to secondary portions 38A-38F. The clear polymer material forming the main portion 36 can then be positioned in a second mold cavity, and opaque, light-blocking thermoplastic polymer material may then be injected to form the secondary portions 38A-38F.

Referring again to FIG. 7, the polymer body 30 may include a plurality of connectors 46A-46G that project from side surface 48 of polymer body 30. The connectors 46 may comprise male "puzzle piece" type connectors that engage female connectors 50A-50G (FIG. 8) of light guides 24A-24G. The connectors 46A-46G and 50A-50G may be substantially similar to the connectors shown in FIGS. 7-11 of U.S. Pat. No. 7,712,933, the entire contents of which are incorporated herein by reference. The LEDs 26A-26G are aligned with the connectors 46A-46G to thereby direct light 40A-40G, respectively, through the connectors 46A-46G into the light guides 24A-24G.

Each of the light guides 24A-24G may comprise a thin sheet of transparent polymer material such as acrylic, polycarbonate, or other material. The light guides 24A-24G preferably have a thickness of about 0.5 mm or less, and the light guides 24A-24G are slidably disposed relative to one another. As discussed in more detail below, this permits the light assembly 1 to flex without damaging the individual light guides 24A-24G and other components. Each of the connectors 46A-46G of polymer body 30 may have a thickness that is equal to the thickness of the corresponding light guides 24A-24G, and the individual connectors 46A-46G may be vertically positioned to align with the individual light guides 24A-24G. Specifically, connectors 24A-24G may comprise "full height" connectors 46A1-46G1 as shown in FIG. 7A. Alternatively, the connectors 46A-46G may have substantially the same thickness as the polymer body 30 whereby the connectors 46A-46G form part of the upper and lower surfaces 42 and 44 of polymer body 30. Connectors 46A2-46G2 having this configuration are shown in FIG. 7B. If the connectors 46A-46G are the same thickness as polymer body 30

(FIG. 7A), the ends 28A-28G of light guides 24A-24G may be cut away as shown by the dashed lines 52A-52G and 54A-54G (FIG. 8) to avoid interference.

Referring again to FIG. 8, the individual light guides 24A-24G may be formed from thin sheets of transparent polymer material that has been cut to form perimeters 56A-56G having the desired shape and size. The perimeters 56A-56G may be the same size and shape. However, the sizes and shapes of the perimeters 56A-56G may be different depending upon the requirements of a particular application. In general, the female connecting features 50A-50G may be cut or otherwise formed in the light guides 24A-24G at the time the perimeters 56A-56G are formed. As noted above, the perimeters 56A-56G may be cut away as shown by the dashed lines 52A-52G and 54A-54G to ensure that light entering the light guides 24A-24G at connectors 50A-50G does not escape into the other light guides 24A-24G. Alternatively, the corners 58A-58G and 60A-60G of light guides 24A-24G may comprise opaque, light-blocking material to thereby prevent entry of light from an LED 26 into the wrong light guide 24A-24G (see also FIG. 9). The light guides 24A-24G may be molded from polymer material, or cut from sheets of polymer material utilizing a saw, water cutter, laser, or other suitable process.

The areas 18A-18G of light guides 24A-24G, respectively, may comprise rough surface areas that are formed by laser treatment of the upper surfaces 62A-62G of light guides 24A-24G, respectively. The outer surfaces of the light guides 24A-24G are preferably smooth (except at areas 18A-18G) to thereby internally reflect light from LEDs 26 except at the areas 18A-18G. The areas 18A-18G may comprise a plurality of surface features extending transverse relative to the adjacent smooth surface areas. This causes light to escape at areas 18A-18G, while being reflected internally in other areas. Light from the LEDs 26 causes the areas 18A-18G to be illuminated, without illuminating the other areas of the light guides 24A-24G. Because the light guides 24A-24G are made of a transparent material, light emitted from the second areas 18A-18G is emitted upwardly through the other light guides, and through the areas 18 (FIG. 1) in outer sheet or layer 4.

The flexible lighted assembly 1 may include a single light engine 22 that is operably connected to the first ends 28A-28G of light guides 24A-24G. Alternatively, the second ends 29A-29G (FIG. 8) of the light guides 24A-24G may include connectors 50A-50G, and a second light engine 22A may be operably connected to the second ends 29a-29g to thereby provide light to the light guides 24A-24G from both ends thereof.

As discussed above, the LEDs 26A-26G may comprise white LEDs, and the light guides 24A-24G may comprise transparent material. If this arrangement is utilized, the illuminated areas 18A-18G will generally have a white color. Alternatively, one or more of the LEDs 26A-26G may comprise a colored LED to thereby cause the areas 18A-18G to selectively illuminate with different colors. Also, the light guides 24A-24G may comprise colored polymer material to provide colored illumination at the second areas 18A-18G.

Also, the individual LEDs 26A-26G may be configured to illuminate at different times. For example, the electrical circuit 32 may be operably connected to a switch (not shown). Upon actuation of the switch, the LEDs 26A-26G may illuminate in sequence with a delay of, for example, one second between the illumination of each LED 26A-26G. The individual LEDs 26A-26G may be selectively turned on and off according to various predefined sequences to provide various lighting effects.

With further reference to FIGS. 10-14, a flexible lighted assembly 101 according to another aspect of the present invention includes an upper layer 104 and a tray 108 that are connected/sealed at perimeters 110 and 112 to form a watertight interior space 114 in substantially the same manner as described in more detail above in connection with the flexible lighted assembly 1. The flexible lighted assembly 101 includes a plurality of light guides 124A-124G that are operably connected to a light engine 122 and/or a light engine 122A. The light guides 124A-124G may be substantially identical to the light guides 24A-24G described in more detail above, and the light engine 122 may be substantially identical to the light engine 22 described in more detail above. The light engine 122A may be substantially identical to the light engine 122.

The upper sheet or member 104 of the flexible lighted assembly 101 may include a flat first area 116 that is covered by a layer of opaque material to block light. The upper sheet or member 104 also includes transparent areas 118A-118G that transmit light from light guides 124A-124G to thereby illuminate the areas 118A-118G. The areas 118A-118G may comprise raised regions as shown in FIGS. 11 and 12. The upper sheet or member 104 may be formed from a thin sheet of polymer material that is thermoformed to raise the areas 118A-118G, or the upper member 104 may be formed by injection molding or the like to thereby form the raised areas 118A-118G. The raised areas 118A-118G may be substantially the same thickness as the area 116, or the member 104 may be thicker in the areas 118A-118G. The areas 118A-118G may be illuminated utilizing LEDs 26A-26G in substantially the same manner as described in more detail above in connection with the flexible lighted assembly 1.

With further reference to FIGS. 15-19, a flexible lighted assembly 130 according to another aspect of the present invention includes an upper sheet 134 and tray 138 that are substantially the same as the upper sheet 4 and tray 8 of the flexible lighted assembly 1 described in more detail above. The flexible lighted assembly 130 includes light guides 154A-154C that have a construction that is substantially similar to the light guides 24A-24G. Light guide 154A is illuminated by a first LED 26A (FIG. 17), second light guide 154B is illuminated by a second LED 26B (FIG. 18), and a third light guide 154C is illuminated by a third LED 26C (FIG. 19). The first light guide 154A may be cut away at 158A and 158B to ensure that only light from LED 26A enters light guide 154A. First light guide 154A includes one or more illuminated areas 160A that form a first lighted zone 156A. The illuminated areas 160A may be formed by laser treatment or other suitable process forming a rough surface on light guide 154A to thereby cause the areas 160A to be illuminated. Similarly, second light guide 154B includes illuminated areas 160B that form a second lighted zone 156B, and third light guide 154B includes one or more illuminated areas 160C that form a third lighting zone 156C.

The individual LEDs 26A-26C may be controlled by an electrical circuit 32 to thereby selectively illuminate lighting zones 156A-156C. For example, the flexible light assembly 130 may be configured to illuminate only the second lighted zone 156B under certain conditions, and illuminate all three zones 156A-156C under other operating conditions. Also, the zones to be lighted may be controlled by a user.

With further reference to FIGS. 20 and 21, a flexible lighted assembly 170 according to another aspect of the present invention may include a housing 172 that is constructed substantially the same as the housing of flexible lighted assembly 1 described in more detail above. The flexible lighted assembly 170 is generally L-shaped, and includes a first leg portion 174, second leg portion 176, and a corner portion 178. A light engine 180 may be disposed within the housing 172 at corner portion 178. Light engine 180 includes LEDs 26A and 26B that provide light to light guides 184A and 184B, respectively. The light engine 180 may be constructed in substantially the same manner as the light engine 22 described in more detail above, and may be connected to light guides 184 utilizing connectors 46A-46G and 50A-50G. The light engine 180 also includes electrical components 32 that are connected to one or more electrical lines 34 to supply power to the LEDs 26A and 26B. The light guides 184A and 184B include illuminated areas 182A and 182B that are formed in substantially the same manner as the illuminated areas 18A-18G (FIG. 8). The illuminated areas 182A and 182B may comprise letters, numbers, designs, or the like.

With further reference to FIG. 23, a flexible lighted assembly 190 is substantially similar to the lighted assembly 170 of FIGS. 20 and 21. However, the light assembly 190 includes a first leg portion 170 having angled first and second portions 174A and 174B, respectively. It will be understood that a flexible light assembly according to the present invention may have virtually any shape required for a particular application.

With further reference to FIG. 24, a flexible lighted assembly 195 according to another aspect of the present invention has an L-shape with a first leg portion 174 and a second leg portion 176. The assembly 195 includes light guides 198A and 198B that are optically connected to a light engine 196 utilizing connectors that are substantially similar to the connectors 46A-46G and 50A-50G described in more detail above in connection with FIGS. 6-8. The first light guide 198A includes a curved edge 197A and an end surface 194A. The second light guide 198B includes a curved edge surface 197B and an end surface 194B. The end surfaces 194A and 194B are connected to light engine 196, and receive light from LED 26. The curved edges 197A and 197B internally reflect light from LED 26 and direct the light along the light guides 198A and 198B to the illuminated areas 182A and 182B, respectively. The illuminated areas 182A and 182B may be formed in substantially the same manner as the illuminated areas 18A-18G discussed in more detail above in connection with FIG. 8.

Referring to FIG. 25, flexible lighted assembly 1 can be bent along a bend 64 without breaking the light guides and other components forming the flexible lighted assembly 1. With further reference to FIG. 26, the flexible lighted assembly 1 may be flexed along a first bend 64 and a second bend 66. It will be understood that the flexible lighted assemblies 101, 130, 170, and 195 may also be flexed along one or more bends 64 and 66 as illustrated in FIGS. 25 and 26.

The flexible lighted assemblies of the present invention may be utilized in a variety of applications. For example, the flexible lighted assemblies may be utilized in connection with a rigid, curved surface. The flexible lighted assemblies can be fabricated and then flexed to match the curved surface as required at the time the lighted assembly is mounted to a vehicle structure (e.g. door sill, dashboard, etc.). In this way, fabrication of the illuminated assembly is simplified because it does not need to be molded to a specific shape prior to installation. Furthermore, production tolerances and the like in the curved surface to be covered are well-tolerated by the flexible lighted assembly.

Furthermore, the flexible lighted assemblies of the present invention may be utilized in parts or other components that are flexed in use. For example, the lighted assemblies may be utilized to provide lighted floor mats for motor vehicles. Also, the lighted assemblies may be positioned on/in an upholstered, padded surface that is flexed in use. For example, the lighted assembly of the present invention may be positioned below a layer of upholstery or the like in a vehicle seat, and the upholstery may be provided with openings corresponding to the illuminated areas. For example, the flexible lighted assembly 101 (FIGS. 10-14) may be utilized in a vehicle seat or floor mat with upholstery 106 covering the area 116 of flexible lighted assembly 101. Openings 107 may be formed in the upholstery 116, with the raised 118A-118G protruding through the openings 107 in upholstery 106. If the flexible lighted assembly 101 is used on an upholstered seating surface, padded, upholstered interior panel, or the like, the upper sheet 104 may be made from a stretchable material such as a thermoplastic elastomer (e.g. Santoprene®) having light-transmitting properties. If a stretchable material is utilized to form the upper sheet 104 the tray 108 may be formed from a somewhat more rigid polymer material. For this type of an application, the upper sheet 104 may have a thickness in the range of 0.25 mm-2 mm or more, and the tray 108 may be formed from polymer material having a thickness in the range of about 0.25 mm to about 1.0 mm. A flexible lighted assembly 101 constructed in this manner may also be utilized in lighted floor mats for motor vehicles. In this case, the upholstery 106 may comprise carpet or the like, or it may comprise a thin sheet of elastomeric material. The floor mat 109 may cover the tray 108 such that the flexible lighted assembly 101 is substantially contained within the floor mat 109. The floor mat 109 may be made from a flexible opaque polymer or elastomeric material, and the upper sheet 104 may be molded from a white light transmitting material whereby by the areas 118A-118G are clearly visible when LEDs 26 are turned off, provided sufficient ambient light is available.

The materials utilized to form the outer sheet 4 and tray 8 of flexible lighted assembly 1 and upper sheet 104 and tray 108 of flexible lighted assembly 101 may be selected to have the necessary degree of flexibility and/or stretch required for a particular application. For example, the upper layer 4 or 104 may be made from a relatively rigid transparent polymer material (e.g. acrylic, polycarbonate, etc.), and the tray 8 or 108 may be made from a flexible/stretchable material. For example, the tray 8 or 108 may be made from foam, an elastomeric material, a thermoplastic elastomer such as Santoprene®, urethanes, silicones, neoprene, latex, or EPDM. In general, at least one of the outer layer 4/104 and tray 8/108 is made from a stretchable material to permit flexing of the flexible lighted assembly 1/101. The flexible lighted assemblies 130, 170, and 195 may also be constructed utilizing flexible/stretchable materials to achieve the desired degree of flexibility.

With further reference to FIG. 27, a flexible light assembly 200 according to another aspect of the present invention is similar to the flexible light assembly 130 of FIGS. 17-19, and include a housing formed by members 204 and 208. The light guide 154A (FIG. 17) may include cutouts 158a and 158b that form a "bridge" or extension 166A extending to the LED 26A. Light guide 154B may include a cutout 162 that forms a bridge or extension 166B extending to LED 26B, and light guide 154C may include a cutout 164 that forms a bridge or extension 166C extending to LED 26C. The bridges 166A-166C may include a female cutout or connector that is substantially the same as the connectors 50A-50G (FIG. 8), and light engine 22 may include a plurality of connectors 46A-46C that connect to the connectors 50A-50C of light engine 22. Light from LEDs 26A-26C is thereby provided to the light guides 154A-154C, respectively. As discussed above, the connectors 46A-46C may have the same thickness as the light engine 22, such that the connectors 46A-46C extend from upper surface 42 to lower surface 44 of light engine 22. Alternatively, the connectors 46A-46c may have a thickness that is substantially equal to the thickness of the light guides 154A-154C, respectively, and the connectors 46A-46C may be positioned at a height that is equal to the height of the light guides 154A-154C. Alternatively, as shown in FIG. 27 the LEDs 26A-26C may all be positioned at the same central height within light engine 22, and the bridges 166A-166C may be flexed to align the ends 168A-168C of bridges 166A-166C with the LEDs 26A-26C. The ends 168A-168C of the bridges 166A-166C may include female connectors 50A-50C that are secured to connectors 46A-46C of light engine 22 utilizing a clear adhesive or the like.

With further reference to FIG. 28, a flexible light assembly 210 according to another aspect of the present invention includes a construction that is similar to the flexible light assembly 200 of FIG. 27, and includes a housing formed by members 214 and 218. However, the flexible light assembly 210 includes a light engine 215 having a plurality of LEDs 26A-26C that provide light to the bridges 166A-166c utilizing opaque polymer material 212. Light engine 215 has a construction that is substantially similar to the light engine 22 (FIGS. 6 and 7), except that the body 30 includes a transparent main portion 216 and opaque polymer portions 212 that are integrally molded utilizing a two-step injection molding process that is similar to the process described in more detail above in connection with the secondary portions 38A-38F (FIG. 7). The opaque polymer portions 212 may be wedge-shaped to direct light up or down as required from LEDs 26A-26C to the proper light guide 154A-154C. The opaque polymer portions 212 ensure that the light from LED 26A is received only in light guide 154A, and that the light from LED 26B is received only in the light guide 154B, and that light from LED 26C is received only in light guide 156C. Light engine 215 may include connectors as shown in FIGS. 7A and/or 7B.

With further reference to FIG. 29, a flexible light assembly 220 according to another aspect of the present invention has a construction that is similar to the flexible light assemblies 200 and 210 of FIGS. 27 and 28, and includes a housing formed by members 224 and 228. However, the flexible lighted assembly 220 includes a tray 8A having a raised area 122 that selectively blocks light from LEDs 26A-26C and also supports the bridges 166A-166C of light guides 154A-154C, respectively. The raised portion 122 may be configured to support the bridges 166A-166C at the proper height to align the bridges 166A-166C with the LEDs 26A-26C of light engine 22. The LEDs 26A-26C may be positioned within the polymer body 30 of light engine 22 at different heights to thereby align the LEDs 26A-26C with the light guides 154A-154C. The light engine 22 of flexible light assembly 220 may include a plurality of connectors 46A-46C that are the same thickness as the light guides 154A-154C (FIG. 7B), and aligned with the light guides 154A-154C, or "full height" connectors (FIG. 7A).

It will be understood that the light engines and light guides of FIGS. 27-29 may be utilized in connection with the flexible light assemblies of FIGS. 1-26.

With further reference to FIG. 30, the flexible light assemblies of the present invention may also utilize light guides 230A-230G. The light guides 230A-230G are made from thin sheets of transparent polymer material, and include illuminated areas 18A-18G that may be formed by rough surface areas created on the surfaces of the light guides 230A-230G utilizing laser, chemical, or abrasive processes. The ends 234A-234G of light guides 230A-230G respectively are cut or otherwise formed to provide extensions or bridges 236A-236G. The extensions 236A-236G are connected to a light engine 232 in alignment with a selected one of the LEDs 26A-26G. In FIG. 30, each light guide 230A-230G is shown connected to light engine 232, but it will be understood that all of the light guides 230A-230G are connected to a single light engine 232 when fully assembled. The light guides 230A-230G may include protrusions 238A-238G and 240A-240G, respectively. The protrusions 238A-238G and 240A-240G are received in corresponding grooves 142A-142G respectively of light engine 232 to interconnect the light guides 230A-230G to light engine 232. The grooves and protrusions may be utilized instead of the "puzzle piece" connectors of FIGS. 6, 7A, and 7B.

With further reference to FIG. 31, the flexible lighted assemblies of the present invention may include light guides 250A-250G having extensions 252A-252G that receive light from LEDs 26A-26G of a light engine 254. The light engine 254 may be constructed utilizing substantially the same molding process as described in more detail above in connection with FIGS. 6 and 7. Light engine 254 may include a main body 256 that is molded from a transparent polymer material, and a second portion 258 that comprises opaque polymer material that is molded into the transparent polymer main body 256 utilizing a two-shot injection molding process. The opaque polymer second portion 258 may be configured to selectively block light from LEDs 26A-26G to thereby ensure that light from LEDS 26A-26G is transmitted into only the proper light guide 250A-250G. The light guides 250A-250G may include protrusions 260A-260G and 262A-262G that are received in grooves in polymer main body 256 to interconnect light guides 250A-250G to light engine 254.

What is claimed is:
1. A flexible lighted assembly, comprising:
a light source comprising at least one LED;
a plurality of overlapping sheets of flexible light transmitting material, each sheet having first and second opposite side surfaces and a peripheral edge surface extending between the first and second opposite side surfaces, wherein the sheets receive light from the light source and internally reflect the light to thereby guide the light through the sheets, the first and second side surfaces of each sheet including a reflective area that reflects a substantial majority of the light from the LED internally, wherein at least the first side surface includes a light emitting area that permits escape of light from within the sheet whereby the light emitting area can be illuminated by the LED.
2. The flexible lighted assembly of claim 1, wherein:
the LED is at least partially encapsulated in light transmitting material.
3. The flexible lighted assembly of claim 2, wherein:
an outer surface of the light transmitting material of the light source is disposed adjacent the peripheral edge surfaces of the sheets such that light from the LED escapes from the outer surface and enters the peripheral edge surfaces of the sheets.
4. The flexible lighted assembly of claim 3, wherein:
the light source includes a polymer body having a plurality of integrally formed first connectors;
the sheets include second connectors that mechanically and optically connect to the first connectors.
5. The flexible lighted assembly of claim 4, wherein:
the sheets comprise polymer material having a substantially uniform thickness.
6. The flexible lighted assembly of claim 5, wherein:
the sheets have a thickness that is less than about 1.0 mm.

7. The flexible lighted assembly of claim 6, wherein:
the sheets define a length and a width, and wherein the length and the width are both at least about 1.0 cm.

8. The flexible lighted assembly of claim 5, wherein:
the peripheral edges of the sheets are generally rectangular.

9. The flexible lighted assembly of claim 8, wherein:
the peripheral edges of the sheets have substantially the same size and shape.

10. The flexible lighted assembly of claim 5, wherein:
the reflective areas comprise substantially smooth surfaces, and the light emitting areas comprise irregular surfaces that extend transverse relative to the smooth surfaces.

11. The flexible lighted assembly of claim 1, wherein:
the plurality of sheets include an outer sheet and an inner sheet, and wherein the light emitting area of the inner sheet faces the second side surface of the outer sheet whereby light form the light emitting area of the inner sheet passes through the outer sheet.

12. The flexible lighted assembly of claim 11, wherein:
the light emitting areas of the outer sheet and the inner sheet do not overlap.

13. The flexible lighted assembly of claim 1, wherein:
the light source includes a plurality of LEDs.

14. The flexible lighted assembly of claim 13, wherein:
each LED only provides light to a single one of the sheets.

15. The flexible lighted assembly of claim 1, including:
a housing defining an internal space; and wherein:
the light source and the sheets are disposed in the internal space.

16. The flexible lighted assembly of claim 15, wherein:
the housing includes a side wall that overlaps the sheets, and wherein the side wall includes light transmitting areas that are generally aligned with the light emitting areas of the sheets, the side wall further comprising opaque areas that are generally aligned with the reflective areas of the first side surfaces of the sheets.

17. The flexible lighted assembly of claim 16, wherein:
the side wall comprises light transmitting polymer material having a layer of opaque material disposed thereon to form the opaque areas.

18. The flexible lighted assembly of claim 16, wherein:
the side wall comprises a sheet of polymer material having a substantially uniform thickness.

19. The flexible lighted assembly of claim 16, wherein:
the side wall comprises polymer material having an outer surface, the outer surface comprising a generally smooth main portion, and at least one raised portion that projects outwardly from the main portion.

20. The flexible lighted assembly of claim 19, wherein:
the plurality of sheets comprise at least first and second sheets;
the raised portion comprises first and second raised portions that are generally aligned with the light emitting areas of the first and second sheets, respectively, whereby light from the light emitting areas of the first and second sheets illuminates the first and second raised portions.

21. The flexible lighted assembly of claim 20, including:
a sheet of flexible material extending over the generally smooth main portion of the outer surface, the flexible material having first and second openings therethrough; and wherein:
the first and second raised portions extend through the first and second openings, respectively.

22. The flexible lighted assembly of claim 21, wherein:
the sheet of flexible material comprises upholstery for a vehicle interior component.

23. The flexible lighted assembly of claim 21, wherein:
the sheet of flexible material comprises at least one of a polymeric material and an elastomeric material.

24. The flexible lighted assembly of claim 15, wherein:
the internal space of the housing is water tight.

25. The flexible lighted assembly of claim 15, wherein:
the housing defines inner and outer sides and a peripheral edge, the housing including inner and outer members defining peripheral edge portions that are interconnected with one another around the peripheral edge.

26. The flexible lighted assembly of claim 25, wherein:
the inner and outer members comprise dissimilar first and second materials, respectively, and wherein one of the first and second materials comprises a stretchable elastomeric material, and the other of the first and second materials comprises a non-stretchable polymer material.

27. The flexible lighted assembly of claim 25, wherein:
the stretchable elastomeric material comprises foam.

28. The flexible lighted assembly of claim 25, wherein:
the outer member comprises a sheet of material having opposite side surfaces that are generally planar when the outer member is in a non-deformed state;
the inner member comprises a first sidewall portion that is generally parallel to the outer member, and transverse sidewall portions extending from the first sidewall portion to define shallow cavity that is closed off by the outer member.

29. The flexible lighted assembly of claim 1, wherein:
the opposite side surfaces of adjacent sheets are slidably engaged with one another whereby the opposite side surfaces slide relative to one another as the sheets are flexed.

30. A method of making a flexible lighted assembly, the method comprising:
providing a light source;
forming a plurality of light guides from thin sheets of light transmitting polymer material having first and second opposite side faces that are generally smooth and internally reflect light introduced at edges of the sheets;
treating at least a portion of the first side face of each sheet to form light emitting surface features defining light emitting areas;
overlapping portions of the light guides;
operably connecting the light source to the light guides whereby light from the light source is transmitted through the light guides and illuminates the light emitting areas.

31. The method of claim 30, wherein:
the light guides are formed by cutting thin sheets of polymer material.

32. The method of claim 30, wherein:
at least a portion of the light emitting areas of the light guides do not overlap.

33. The method of claim 30, including:
providing a plurality of LEDs;
encapsulating the LEDs in a polymer body having a plurality of integrally formed first connectors;
forming integral second connectors in the edges of the light guides;
mechanically and optically connecting the polymer body to the edges of the light guides.

34. The method of claim 30, including:
providing a flexible floor mat for a vehicle, position the light source and the light guides within the flexible floor mat whereby only the light emitting areas are visible.

35. The method of claim 30, including:
providing a flexible upholstery material having inner and outer sides;
forming openings in the upholstery material;
positioning the light guides on the inner side of the upholstery material with the openings aligned with the light emitting areas.

36. The method of claim 30, including:
providing a flexible housing;
positioning the light source and light guides in the housing.

* * * * *